A. A. CALL.
Ball-Target Thrower.

No. 207,389 Patented Aug. 27, 1878.

Witnesses:
T. C. Brecht
W. H. Chandler

Inventor:
Ambrose A. Call
Per W. R. Singleton
Atty

UNITED STATES PATENT OFFICE.

AMBROSE A. CALL, OF ALGONA, IOWA.

IMPROVEMENT IN BALL-TARGET THROWERS.

Specification forming part of Letters Patent No. 207,389, dated August 27, 1878; application filed September 7, 1877.

*To all whom it may concern:*

Be it known that I, AMBROSE A. CALL, of Algona, in the county of Kossuth and State of Iowa, have invented certain new and useful Improvements in Glass-Ball Traps; and I do hereby declare that the following is a full, clear, and exact description thereof, which will enable others skilled in the art to which it appertains to make and use the same, reference being had to the accompanying drawings, and to letters of reference marked thereon, which form a part of this specification.

This invention relates to a glass-ball trap, which is used to throw balls for target practice; and consists in the manner in which the throwing-spring and attachments are pivoted upon a fixed bed-frame, so that the same may be traversed at any angle and temporarily held here.

It also consists in the arrangement of the springing-cords which operate the trap, so that at whatever angle the trap may be traversed the operator need not change his position, all of which will be more fully hereinafter set forth and claimed.

Figure 1:
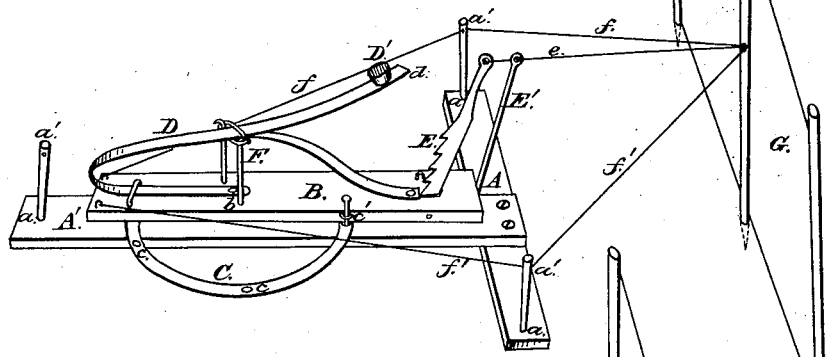
Figure 3:
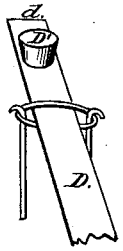
Figure 2:
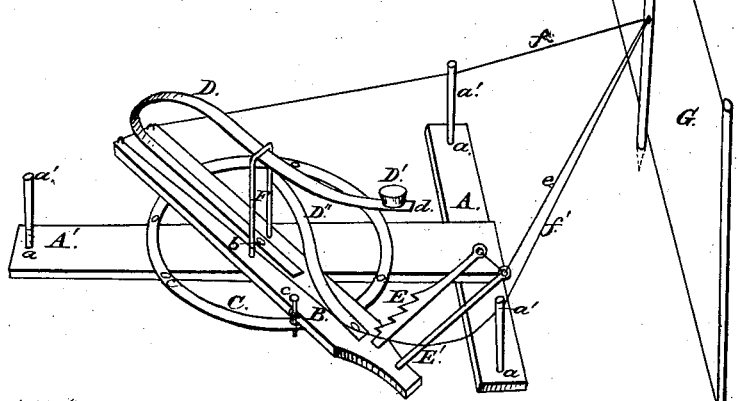

Figure 1 is a perspective view in one position of the traverse. Fig. 2 is another perspective view, showing the traverse-bar at an angle to the bed-frame. Fig. 3 is a separate view of the end of the spring, showing a modification of the stirrup.

A A' is a bed-frame of any convenient shape and construction. The simplest form is a T, which has at the end of each arm a hole, $a\ a\ a$, through which stakes $a'$ are to be driven, to secure the bed A A' to the ground. On the stem A' of the bed is fastened a metallic circular plate, C. Secured to A' is a central pin, $b$, which passes up through the traverse-bar B, which is held down by a button or any other convenient method, so that the bar B may traverse the bed A A' at any angle. On B is a doubled spring, D, secured to it below, with its upper end, $d$, free, having attached to it a cup, D'. Below spring D is a second spring, D'', also fastened to bar B at one end, its other end pressing the under side of spring D. Pivoted to B is a ratchet-bar, E, having a loop or eye in the upper end, to which can be fastened a cord, $e$. Attached to bar B is a rod, E', having also an eye in its upper end, through which the cord $e$ is to pass. At the outer corners of bar B there are loops, to which can be fastened cords $f\ f'$, which cords are to pass through holes in the stakes $a'\ a'$, and from them through a hole in the screen to the person who is to operate the traverse-bar B, to give the trap any direction he may wish.

The outer end, $d$, of spring D will fit any of the notches in ratchet-bar E when the latter is erect, and will hold the spring, the tension being regulated by the notches, as any number of teeth can be cut in the ratchet-bar, to give little or much force to the spring.

On bar B is a stirrup, F, which may be of one piece of metal, as in Fig. 2, or of two standards curved at their upper ends to retain a strong india-rubber spring, as in Figs. 1 and 3; but I prefer that shown in Fig. 2, of one piece.

It will be seen in Figs. 1 and 2 that the ratchet-bar has been pulled back, and the spring D is represented as having been released and the ball tossed from the cup by the spring D striking the stirrup F, the spring D'' assisting to throw it upward.

The screen G is made of fabric supported by stakes, upon which it can be rolled to make it conveniently portable. Its purpose is to conceal from the marksman the direction in which the balls are to be thrown until they rise above the screen, the operator being in its rear.

In Fig. 2 the traverse-bar B is slightly changed at one end, to serve as a handle by which it can be moved.

In the circle C are small holes $c\ c\ c$, and on either or both edges of the traverse-bar B may be small loops, to correspond with the holes $c\ c\ c$ in the circle C, and by dropping into them a pin, $c'$, the traverse-bar can be held at any angle.

I claim—

1. The combination of the tripping-cord $e$, guide E', catch E, revolving traverse-bar B, and spring D, substantially as and for the purpose described.

2. The combination of the traverse-bar, the fixed bed, and the cords leading from the outer end of the traverse-bar through the holding-stakes or other part of the bed, for the purpose of giving direction to the traverse-bar.

In testimony that I claim the foregoing as my own I affix my signature in presence of two witnesses.

AMBROSE A. CALL.

Witnesses:
 JOHN B. JONES,
 JOHN E. BLACKFORD.